(12) United States Patent
Melnychenko et al.

(10) Patent No.: US 8,990,223 B2
(45) Date of Patent: Mar. 24, 2015

(54) SYSTEMS AND METHODS FOR MATCHING MEDIA CONTENT DATA

(75) Inventors: Mark A. Melnychenko, Avondale, PA (US); Beth A. Gehman, Quakertown, PA (US); Susan E. Grant, Royersford, PA (US); Jason Mowry, Phoenixville, PA (US); Jill Mowry, Phoenixville, PA (US); Kenneth Murphy, Fort Washington, PA (US); Victoria Tang, Malvern, PA (US); Xiaomin Wang, Phoenixville, PA (US); Jennifer M. Wolfe, Schwenksville, PA (US); Paul Wolfe, Schwenksville, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 181 days.

(21) Appl. No.: 13/537,664

(22) Filed: Jun. 29, 2012

(65) Prior Publication Data

US 2014/0006423 A1    Jan. 2, 2014

(51) Int. Cl.
*G06F 7/00*     (2006.01)
*G06F 17/30*    (2006.01)

(52) U.S. Cl.
CPC ...... *G06F 17/3053* (2013.01); *G06F 17/30542* (2013.01); *G06F 17/30699* (2013.01); *G06F 17/30023* (2013.01)
USPC ............................ 707/748; 707/749; 707/758

(58) Field of Classification Search
USPC ........................................ 707/748, 749, 758
See application file for complete search history.

(56) References Cited

U.S. PATENT DOCUMENTS

| 6,536,041 | B1 | 3/2003 | Knudson et al. |
| 6,687,734 | B1 | 2/2004 | Sellink et al. |
| 7,254,829 | B1 | 8/2007 | Brown et al. |
| 2003/0182101 | A1* | 9/2003 | Lambert ........................... 704/1 |
| 2010/0057645 | A1* | 3/2010 | Lauritsen ........................ 706/11 |
| 2013/0210406 | A1* | 8/2013 | Vidal et al. ................... 455/418 |

OTHER PUBLICATIONS

Ji et al., Efficient interactive fuzzy keyword search, International World Wide Web Conference Committee, Madrid, Spain, Apr. 20-24, 2009, pp. 371-380.

* cited by examiner

*Primary Examiner* — Tony Mahmoudi
*Assistant Examiner* — Merilyn Nguyen
(74) *Attorney, Agent, or Firm* — Ropes & Gray LLP

(57) ABSTRACT

Methods and systems are described herein for managing an aggregation database. Matching rules that describe filters may be defined to determine how to match a media content record received from an external source to a stored record in the aggregation database. Fuzzy matching may be used to match attribute fields of the received record and stored records. Based on the results of the fuzzy matching, the received primary media content record may be linked to a stored record in the aggregation database.

20 Claims, 13 Drawing Sheets

| 1010 | RULE TYPE 1 | | | |
|---|---|---|---|---|
| 1015 | ↳EVALUATION METRIC | | | |
| 1020 | 1 | COMPARISON TYPE | COMPARISON FIELD | WEIGHT |
| | 2 | COMPARISON TYPE | COMPARISON FIELD | WEIGHT |
| | ⋮ | | | |
| | N | COMPARISON TYPE | COMPARISON FIELD | WEIGHT |
| 1030 | RULE TYPE 2 | | | |
| 1035 | ↳EVALUATION METRIC | | | |
| 1040 | 1 | COMPARISON TYPE | COMPARISON FIELD | WEIGHT |
| | ⋮ | | | |
| | N | COMPARISON TYPE | COMPARISON FIELD | WEIGHT |

FIG. 10A

| 1050 | WEIGHTED SCORE | | | |
|---|---|---|---|---|
| 1055 | ↳THRESHOLD ; EXCEED ; 50 | | | |
| 1056 | 1 | FUZZY MATCH | TITLE | 0.5 |
| 1057 | 2 | FUZZY MATCH | CAST | 0.2 |
| 1058 | 3 | FUZZY MATCH | DIRECTOR | 0.3 |
| 1060 | BINARY MATCHES | | | |
| 1065 | ↳NUMBER MATCHES ; EXCEED ; 50% | | | |
| 1066 | 1 | EQUAL | RATING | 1 |
| 1067 | 2 | EQUAL | YEAR | 1 |
| 1068 | 3 | EQUAL | GENRE | 1 |

FIG. 10B

SYSTEMS AND METHODS FOR MATCHING MEDIA CONTENT DATA

BACKGROUND OF THE DISCLOSURE

Media content is viewable on a variety of user devices. Electronic program guide applications are used to navigate the multitude of media guidance information that corresponds to the viewable media content. A plurality of information sources may provide the media guidance information to electronic program guide applications, which may be implemented on user devices for end-users.

SUMMARY OF THE DISCLOSURE

The diversity of media content providers and of modes of media content delivery have increased in recent years. Consequently, a viewer may access the same program in many ways. For example, a user may stream a movie from multiple websites on the internet, purchase and download a digital version of the movie from a website, watch the movie through an on-demand television delivery service, or watch the movie through a television broadcast at a predetermined time. In addition, different but related programs may share the same title. For example, several different movies share the same title, "Alice in Wonderland." These include a live-action movie directed by Tim Burton and released in 2010, an animated movie produced by the Disney Corporation and released in 1951, and a live-action film released in 1989. The present disclosure addresses efficiently consolidating information about the multitude of media content and to accurately match different media content that share common attributes, such as title, to respective records in an aggregation database.

In view of the foregoing, methods and systems are provided for managing an aggregation database of media guidance information. A server or other computer equipment running a media management application and coupled to an aggregation database may receive a primary media content record from an external data source. Control circuitry of the computer equipment may compare a group of attributes of the received primary media content record against a corresponding group of attributes of each candidate record in a first set of candidate media content records stored in the aggregation database. The control circuitry may compute an attribute score for each attribute of the group of attributes for each candidate media content record in the first set of records based on the comparison of attributes. A composite score for each candidate media content record may be computed by the control circuitry by computing a weighted average of the attribute scores. Based on the composite scores of the candidate media content records stored in the database, the received primary media content record is linked to a stored candidate media content record.

In some embodiments, the first set of media content records of the database may be selected based on a comparison of a title attribute of the received primary media content record to a title attribute of each media content record or a subset of the media content records stored in the database.

In some embodiments, fuzzy matching may be used to compare the attributes of the received primary media content record to the stored candidate content records. Control circuitry of the computer equipment may perform a fuzzy matching of a first group of attributes of the received primary media content record to a respective plurality of attributes of each media content record of the first set. A fuzzy matching attribute score may be computed for each attribute of each media content record in the first set, and a composite score may be computed as a weighted average of the fuzzy matching attribute scores.

Control circuitry of a computer equipment may select a second set of media content records from the first set based on the composite scores of the first set. A binary comparison may be performed on a first discrete attribute of the received primary media content record and against a respective discrete attribute of each media content record of the second set. The linking of the received primary media content record to a stored candidate content record may be based on the binary comparisons of the discrete fields. Candidate media content records may be discarded from the first set of candidate records based on the composite scores of the first set of records.

The composite score of a stored candidate content record may be compared against a threshold value. In some embodiments the linking of the received primary media content record to a stored candidate content record may be based on the comparison of the composite score to a threshold value. In some embodiments, the received primary media content record may be linked to a stored candidate content record by linking the received primary media content record to a data cluster in the aggregation database. In some embodiments, control circuitry of computer equipment running a media management application may generate a new media content record in the aggregation database in response to determining that the composite score is below the threshold.

In some embodiments, the control circuitry may determine that a group of stored candidate records in the aggregation database are duplicates that correspond to the received primary media content record. In response, the control circuitry may merge the group of duplicate stored candidate records.

In some embodiments, the control circuitry may create rule data structures to define filter rules based on user input. The rule data structure may include a vector of attributes to be compared during a matching process to generate composite scores.

In some embodiments, control circuitry may determine that a received primary record corresponds to a candidate media content record. In response, the control circuitry may update attributes of the candidate media content record based on attributes of the received primary record.

It should be noted the systems and/or methods described above may be applied to, or used in accordance with, other systems, methods and/or apparatuses.

BRIEF DESCRIPTION OF THE DRAWINGS

FIGS. 10A-B illustrate examples of data structures for matching rules in some embodiments of the present disclosure;

DETAILED DESCRIPTION OF EMBODIMENTS

Figure 1:
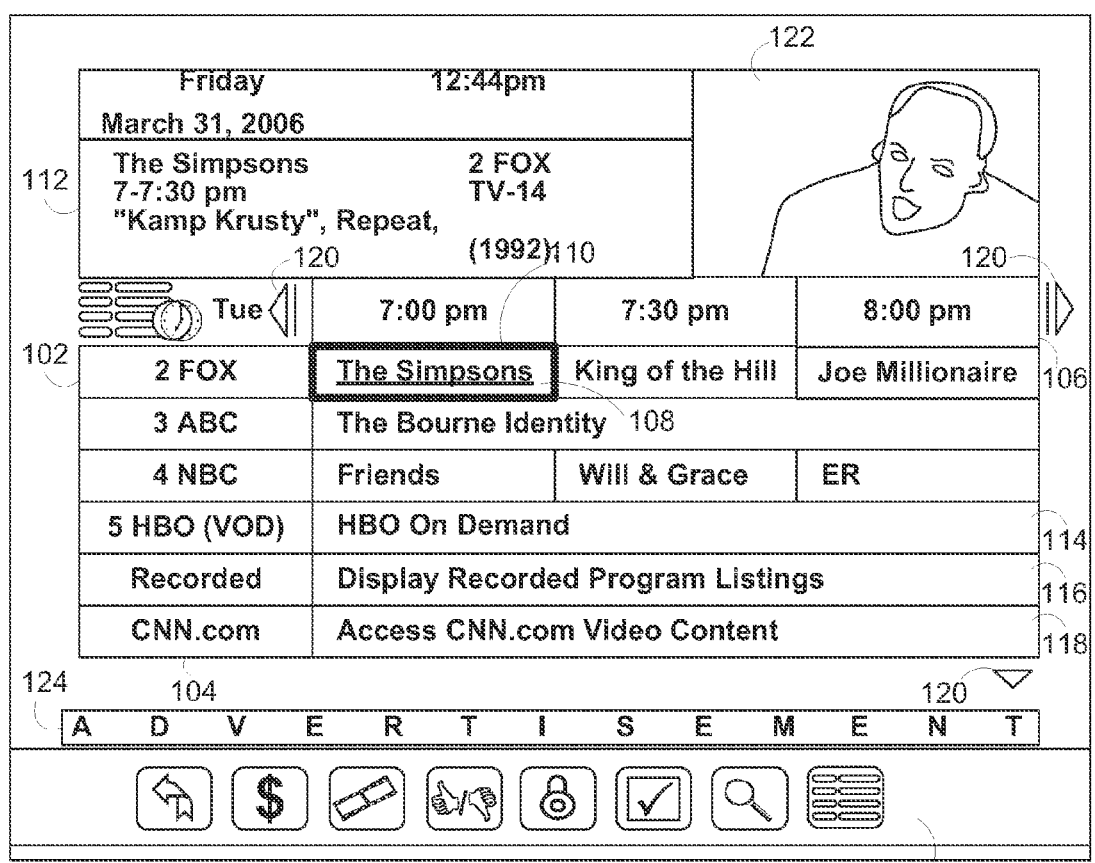
FIG. 1 shows an illustrative interactive media guidance application display screen in accordance with some embodiments of the present disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

In addition to media guidance applications, there are media management applications that consolidate media content information from one or more external data sources for presentation in a media guidance application. A media management application may be coupled to an aggregation database that stores media content records describing media content programs. For example, a media management application may receive a primary record containing guidance information about media content from an external source. Control circuitry of a computer running the media management application may then compare the received primary record to a set of stored candidate records selected from the aggregation database. As referred to herein, the terms "guidance application" and "media guidance application" are interchangeable, and the terms "management application" and "media management application" are interchangeable. The term "media application" refers to a media guidance application or a media management application.

For discussion purposes, the term "primary record" or "primary media content record" will refer to a media content record received from an external data source such as a web server. The term "candidate record" or "candidate media content record" will refer to a media content record that is stored in an aggregation database, which consolidates media content information from various external data sources. For example, the aggregation database may be maintained by Rovi Corporation and used to generate program guides for media content available from various sources described further below in FIG. 4.

In illustrative example, two different movies may share the same title "Alice in Wonderland." A first movie may be a live-action one, and a second movie may be an animated one. Records for both films may be stored in an aggregation database. A primary record may be received that has a title, "Alice in Wonderland" that is identical to the title of the first and second stored candidate records. The primary record may be received from an external data source, such as an online streamlining website. The primary record may be matched to either a first candidate record corresponding to the live-action movie or a second candidate record corresponding to the animated movie, based on a comparison of attributes of the primary record and candidate records. The attribute information in a matching candidate record may be updated based on the information in the matching primary record.

Interactive media guidance applications may take various forms depending on the content for which they provide guidance. One type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance. Such guidance applications are supported by aggregation databases capable of storing and organizing a large amount of media content information from various media content sources and media guidance data sources.

With the advent of the Internet, mobile computing, and high-speed wireless networks, users are accessing media on user equipment devices on which they traditionally did not. As referred to herein, the phrase "computer equipment," "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data," "guidance information" or "guidance data" should be understood to mean any data related to content, such as media listings, media-related information (e.g., content attributes such as broadcast times, broadcast channels, titles, descriptions, ratings information (e.g., parental control ratings, critic's ratings, etc.), genre or category information, actor information, logo data for broadcasters' or providers' logos, metadata tags, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections. As referred to herein, the phrase, "media application parameters" should be understood to mean data used in operating the guidance application or management, such as program information, guidance application settings, user preferences, or user profile information.

Figure 2:
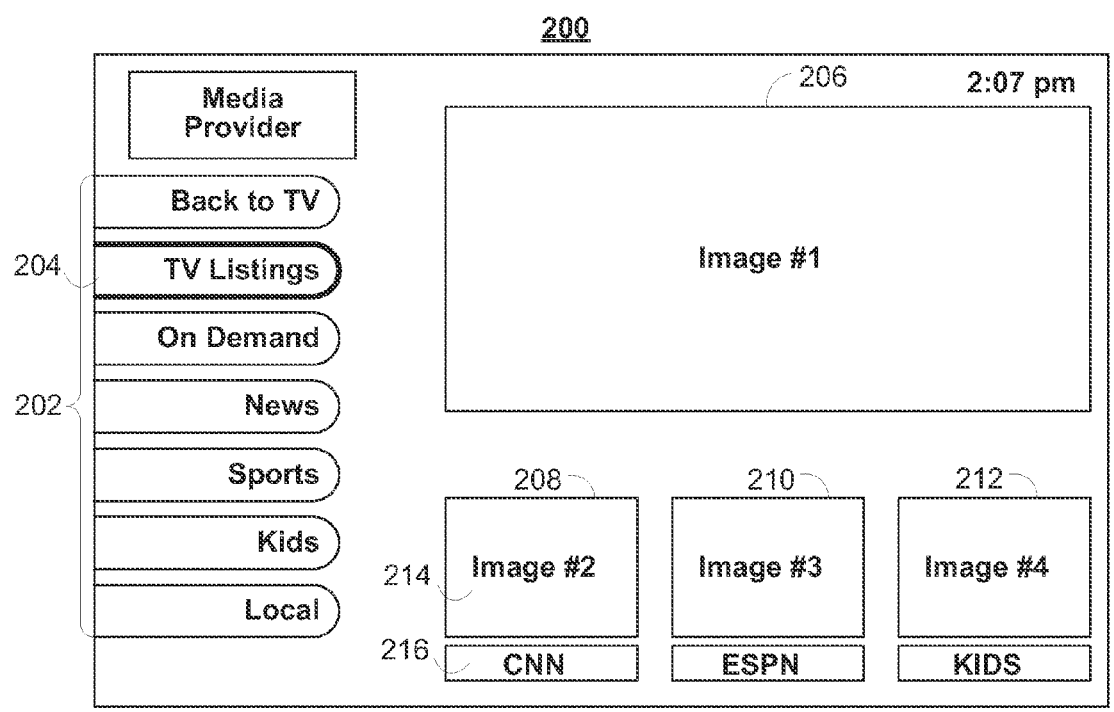
FIG. 2 shows another illustrative interactive media guidance application display screen in accordance with some embodiments of the present disclosure.

FIGS. 1-2 show illustrative display screens that may be used to provide media guidance data. The display screens shown in FIGS. 1-2 and 5-13 may be implemented on any suitable user equipment device or platform. While the displays of FIGS. 1-2 and 5-13 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by media application parameters.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g. FTP).

A program listing 108 may be selected to access detailed media application parameters about a media asset, in addition to the information displayed in program information region 112. The detailed media application parameters may be displayed in program information region 112, in a full-screen display, or as an overlay display that may obscure, in part or completely, media application data screens of FIG. 1. An example of a display screen showing detailed media application parameters is provided in FIG. 5.

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different from display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a manner similar to selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other airtimes or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

The listings of display screen 200 may be selected to access detailed media application parameters about a media asset in a similar fashion as described above in reference to program listing 108. In response to selection of a listing, a detailed guidance information screen may be shown in a full-screen display or as an overlay display. Further details of the media application parameters screen are discussed further below in reference to FIG. 5.

In addition to the media guidance applications discussed above in reference to accessing content and guidance information by users, media management applications consolidate and organize large amounts of guidance information for access by and delivery to end-users at media guidance applications.

Figure 3:
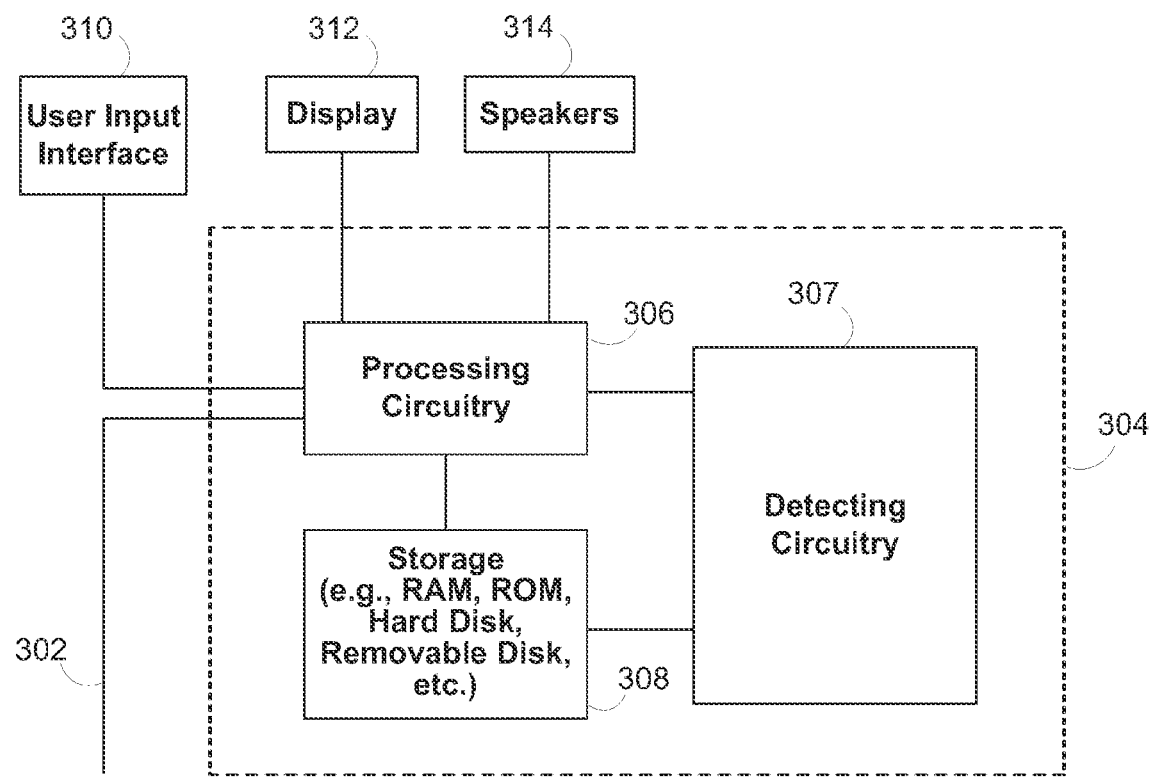
FIG. 3 illustrates an example of a user device that may provide media assets in accordance with some embodiments of the present disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. The illustrative user equipment device 300 may be used to implement media management applications that are used by administrators. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean any circuitry; for example, circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units; for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, for example, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and media application parameters, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
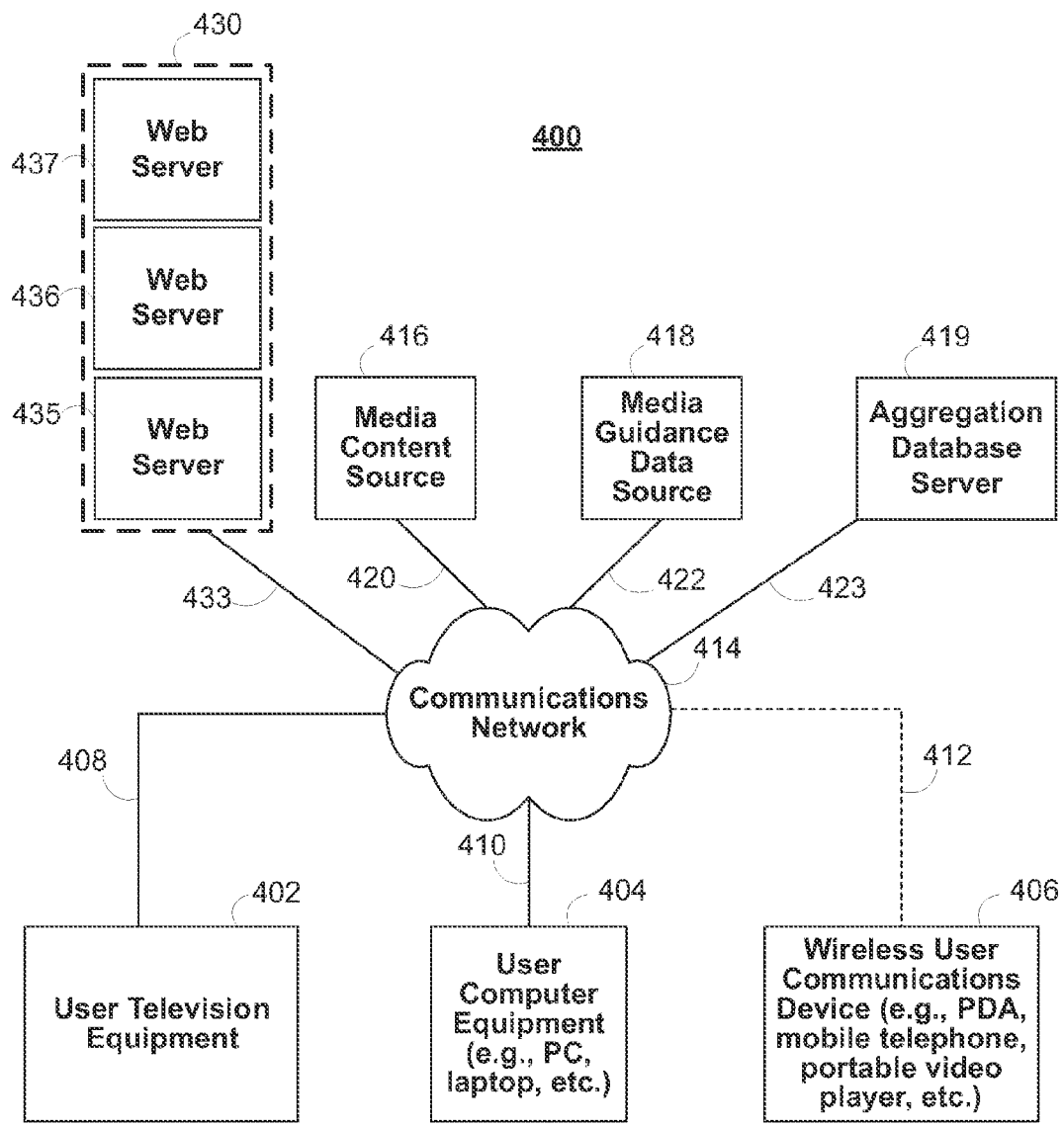
FIG. 4 illustrates an example of a system that provides media assets in accordance with some embodiments of the present disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application or media management application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416, media guidance data source 418, aggregation database 419, and one or more web servers 430, coupled to communications network 414 via communication paths 420, 422, 423, and 433 respectively. Paths 420, 422, 423, and 433 may include any of the communication paths described above in connection with paths 408, 410, and 412. Each of content source 416, media guidance data source 418, and web servers 430 are external sources to the aggregation database 419 that stores guidance information records used by the media management applications. The Communications with the content source 416, media guidance data source 418, aggregation database 419, and one or more web servers 430 may be exchanged over one or more communications paths, but are shown as a single path in FIG. 4 to avoid overcomplicating the drawing. In addition, there may be more than one of each of content source 416, media guidance data source 418, aggregation database 419, but only one of each is shown in FIG. 4 to avoid overcomplicating the drawing. Several instances of web servers 435, 436 and 437 have been illustrated and will be referenced in discussion further below in reference to FIG. 6. (The different types of each of these sources are discussed below.) If desired, content source 416 and media guidance data source 418 may be integrated as one source device. Although communications between sources 416 and 418, web servers 430, and aggregation database 419 with user equipment devices 402, 404, and 406 are shown as through communications network 414, in some embodiments, each of the equipment 416, 418, 419 and 430 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

Web servers 430 may be any number of one or more web servers. For purposes of illustration and simplicity, only three web servers 435, 436 and 437, have been drawn. A web server may host a website, social network, an internet database of information, or any other suitable online service. A web server may be any suitable computer equipment device as described above in reference to FIG. 3. In some embodiments, a web server may act as a media content source, for example, streaming video websites, or as a media guidance data source, for example, a movie review website. In some embodiments, web servers 435-437 may be unrelated. In FIG. 4, the web servers 435-437 have been grouped together as web servers 430 for illustrative purposes.

Aggregation database server 419 may be used by a media management application to consolidate and store media guidance data information received from external data sources. As used herein, the term "aggregation database server" or "aggregation database" may refer to any computer equipment device used to consolidate and store media guidance information about media content available from a variety of sources. External data sources may include web servers 430, media content source 16, media guidance data source 418 or any other suitable data source. In some embodiments, aggregation database 419 may be implemented as a web server. In system 400, aggregation database 419 has been illustrated as a separate functional entity that consolidates information received from other sources in the system. A media management application may be implemented using any of web servers 430, aggregation database 419, any other suitable computer equipment, or any combination thereof. The media management application retrieves records from, and stores records to, the aggregation database.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application. Similarly, media guidance data source 418 may provide media guidance data to aggregation database 419 using a push approach (periodically transmitting media guidance data as records), or pull approach (transmitting media guidance records in response to requests received from the aggregation database or other computer equipment running the media management application).

Media applications may be, for example, stand-alone applications implemented on user equipment devices or computer equipment. For example, the media application may be implemented as software or a set of executable instructions which may be stored in storage 308, and executed by control circuitry 304 of a user equipment device 300. In some embodiments, media applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418, or web server 435) running on control circuitry of the remote server. When executed by control circuitry of the remote server (such as media guidance data source 418 or web server 435), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays. Media management applications may be operated similarly to media guidance applications. Media management applications may be operated by administrators that configure how consolidation and matching of media content records is performed. An administrator may locally operate the media management application at a console of a web server or other suitable equipment, or remotely operate the management application through a client application connected to a web server running the management application.

Content and/or media guidance data delivered to user equipment devices 402, 404, 406 or other computer equipment may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications and media management applications (e.g., web-based applications or cloud-based applications), or the content can be displayed by media guidance applications stored on the user equipment device.

Media guidance and management system 400 is intended to illustrate a number of approaches, or network configurations, by which user equipment devices, computer equipment, and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices and computer equipment may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices and computer equipment may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416, one or more media guidance data sources 418, one or more web servers 430 and one or more aggregation databases 419. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
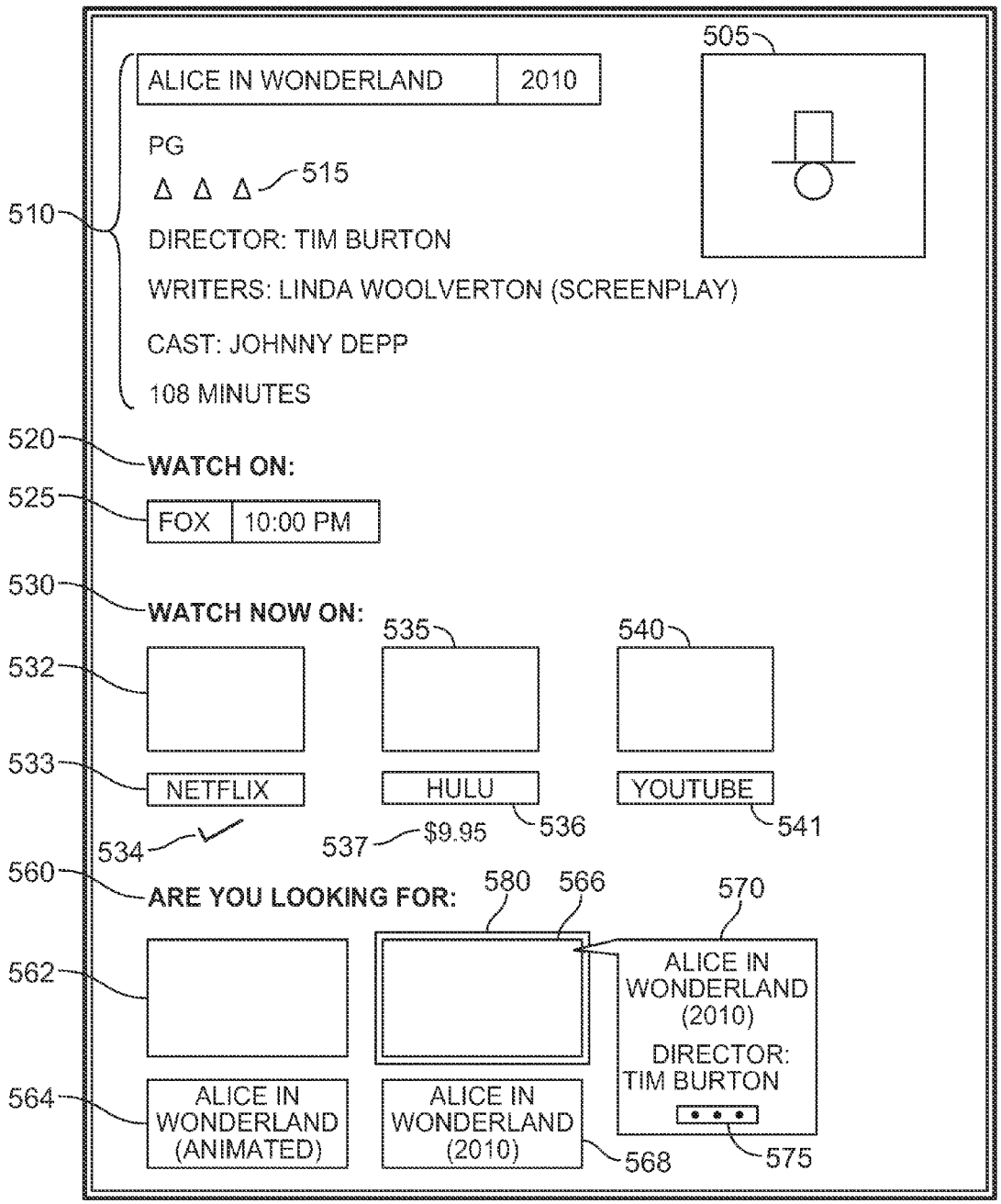
FIG. 5 shows an illustrative interactive media guidance application display screen that includes detailed information about a media asset in accordance with some embodiments of the present disclosure.

FIG. 5 shows an illustrative interactive media guidance application display 500 that includes detailed media application parameters about an associated program. Control circuitry of a computer equipment may show the display 500 in response to receiving a user selection of a program listing, such as program listing 108 illustrated in FIG. 1, any one of listings 206, 208, 210 or 212 illustrated in FIG. 2, or any other suitable listing. Display 500 may include a graphic region 505 which contains a video clip, image or any other suitable graphic that is related to the program associated with the display. Information region 510 provides details about the associated media asset such as title, release year, rating, director, writer, cast, run time, or any other suitable media application parameters. The region 510 may include a user rating 515 that represents a rating input by a user of the media guidance application, or represents a synthesis of ratings input by a plurality of users of the media guidance application.

Display 500 may include content access information regions 520 and 530, and content recommendation region 560. Content access information regions 520 and 530 provide information on how to access a media asset associated with display 500. Broadcast access information region 520 provides information about viewing times for broadcast versions of the associated program. The access information region 520 may include a selectable program listing 525 that includes channel information and broadcast time. In some embodiments, in response to receiving a user selection of selectable program listing 525, the media guidance application may tune to the listed channel if the present time is during the broadcast time of the program. In some embodiments, in response to receiving the user selection of selectable program listing 525, the media guidance application may display, to the user, a menu to set reminders or schedule recordings of the broadcast program.

On-demand access information region 530 provides information about on-demand content assets associated with display 500. For example, access information region 530 may include selectable listings 532, 535, and 540. Each selectable listing corresponds to a media content provider and may include a label 533, 536, or 540 that identifies the provider. For example, listing 532 corresponds to NETFLIX, listing 535 corresponds to HULU, and listing 540 corresponds to YOUTUBE.

Each selectable listing may include an availability indicator 534 that indicates whether the media asset from the associated media content provider is accessible to a user of the media guidance application. For example, a media content access provider may require a subscription in order to access programs from the provider. If a user of the media guidance application has a subscription to the media content provider associated with a listing, an indicator such as 534 may be shown. In some embodiments, if no subscription is required to access media content from the provider, an indicator similar to indicator 534 may be shown. In some embodiments, an indicator different from indicator 534 may be shown to differentiate between accessibility based on subscription, and free accessibility that does not require a subscription. In some embodiments, if no subscription is required, no indicator may be shown next to the listing. In some embodiments, a price 535 may be shown next to a listing to indicate a cost of purchasing an access right to a media asset from a content provider. The price may correspond to a subscription from the media content provider, or to a single access right to the media asset displayed in the listing.

Content recommendation region 560 provides information about programs that may be related to the media asset associated with display 500. The content recommendation region may include selectable listings 562 and 566 that link to displays of detailed media application data for corresponding programs. The linked displays may be similar to display 500. Each selectable listing 562 and 566 may include a corresponding label such as 564 or 568.

In some embodiments, an overlay display region 570 may be displayed by computer equipment in response to receiving a user input indicating that a cursor, highlight region, or other suitable pointer has been moved over a program listing in display 500. For example, outline 580 indicates that program listing 566 is highlighted by a user. In response to determining that a user has highlighted program listing 566, the control circuitry of a computer equipment running a media guidance application may display overlay 570 that includes media application parameters about the program corresponding to program listing 566. Due to limited display screen space, a subset of the media application parameters may be displayed. In response to receiving a user selection of display option 575, control circuitry of a user equipment may direct a display to show more media application parameters. In FIG. 5, the display option 575 is an ellipsis. In response to receiving a selection of option 575, control circuitry directs the display to expand the display area of overlay 570. In some embodiments, the display option may be a scrollbar, a set of arrows, or any other suitable display option for navigating overlay display region 570.

Figure 6:
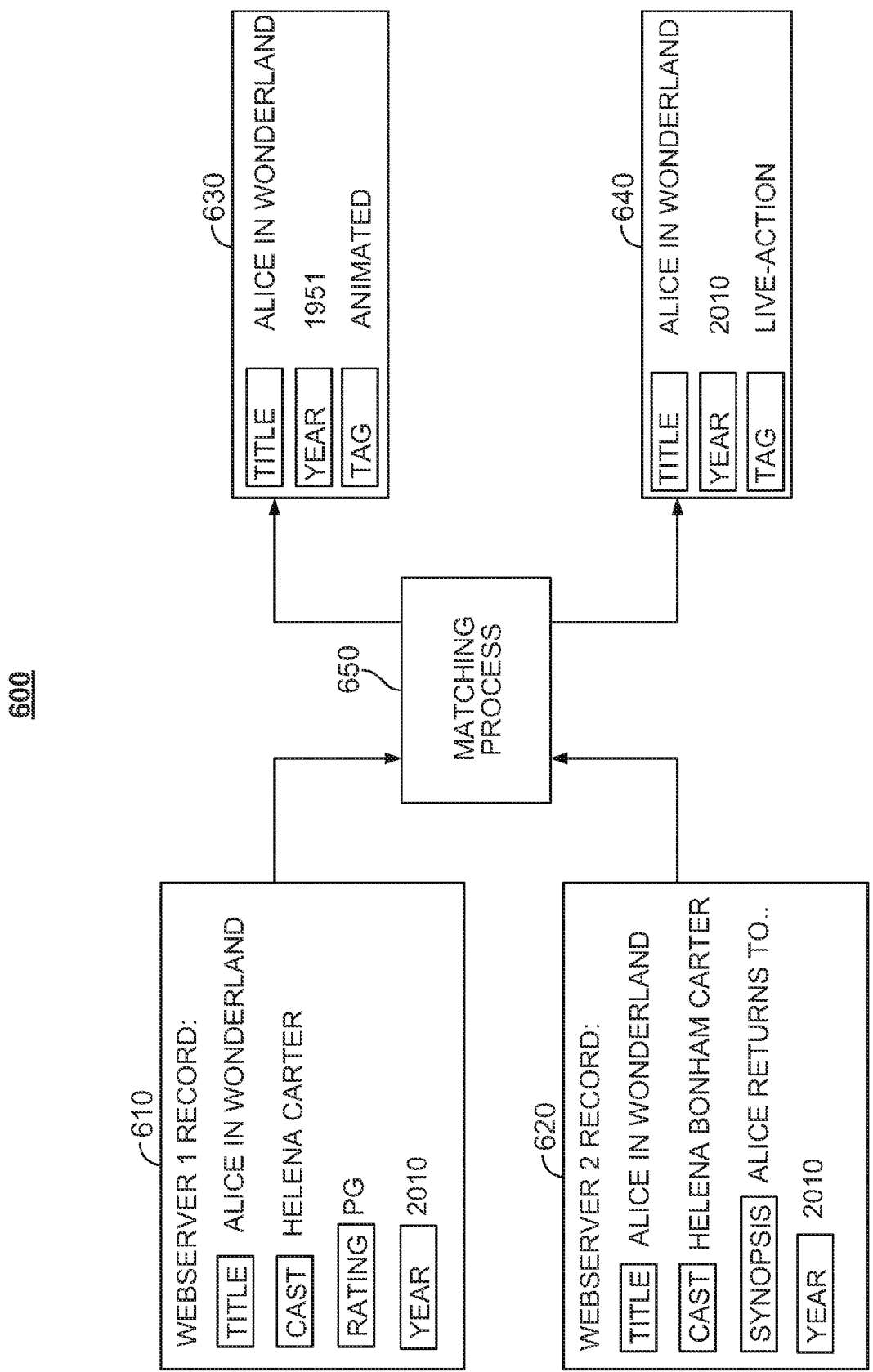
FIG. 6 illustrates an example of a matching process in some embodiments of the present disclosure.

FIG. 6 illustrates an overview of the matching process in some embodiments of the present disclosure. Control circuitry 304 of computer equipment running a media management application may perform the matching process 650 when receiving media content information from an external data source in order to match the received primary media content information to a corresponding record in an aggregation database. The control circuitry may perform the matching process to iteratively determine the corresponding record from a pool of candidate records. Media content information may be received as a primary media content record containing guidance data. In some embodiments, media content records may share common attributes. For example, records 610 and 620 each contain guidance data having the title, cast, and year attributes. In some embodiments, media content records may differ in the constituent attributes. For example, a first media content record 610 may include the rating attribute, and a second media content record 620 may include the synopsis attribute, but not the rating attribute.

A media management application running on a web server 430 may receive a first primary media content record 610 from a first web server 435 and a second primary media content record 620 from a second web server 436. Both records 610 and 620 may have the same title "Alice in Wonderland" and the aggregation database may have records for two different programs having the same title "Alice in Wonderland." A first candidate record 630 in the database may correspond to an animated film while a second candidate record 640 may correspond to a live action film. Records 630 and 640 both contain at least the guidance data attributes of title, year and metadata tags. Although record 630 includes a metadata tag that indicates an animated version of the film, and record 640 includes a metadata tag that indicates a live-action version of the film, neither received record 610 nor 620 contain such metadata tags.

Accordingly, the media guidance application performs the matching process 650 to determine whether to link each received record 610 and 620 to the animated version of record 630 or the live-action version of record 640. As discussed and referred to herein, the process of linking may be performed in data structures that are stored in memory of the control circuitry and computer equipment. For example, when linking a received primary record, control circuitry may direct an aggregation database to create a new record based on information of the primary record. Control circuitry may direct the aggregation database to update the new record and candidate record that include pointers to each other. In some embodiments, control circuitry may direct the aggregation database to update the candidate record to include a pointer to the new record containing information from the primary record. In some embodiments, control circuitry may direct the aggregation database to update the primary record to include a pointer to the candidate record.

As part of the matching process, attribute information from the received record may be incorporated into candidate records. The information may be incorporated during the iterative matching process, or upon determining a corresponding candidate record. For example, the control circuitry of the computer equipment described above may, during the matching process, update a candidate record with attribute information from a received primary record that is determined to be relevant. For example, the control circuitry of the computer equipment may, upon linking a received primary record to a matched candidate, update the matched candidate record to include attributes of the received record that are missing in the candidate record, or update attribute information of the candidate record to include attribute information of the received primary record.

The control circuitry may determine that primary record 610 corresponds to candidate record 640, and in response, add the cast and rating attributes and corresponding information of primary record 610 into candidate record 640. The control circuitry may also determine that primary record 620 corresponds to an updated candidate record 640. Accordingly, the control circuitry may update a cast attribute of candidate record 640 that was previously incorporated from primary record 610 to include the additional cast information from primary record 620.

As part of the matching process, the control circuitry may direct an aggregation database 419 to create a new record for a received primary record that is not matched to a candidate record in the aggregation database. The matching process may use any suitable guidance data as described above. The specifics of the matching process will be described in further detail below.

Figure 7:
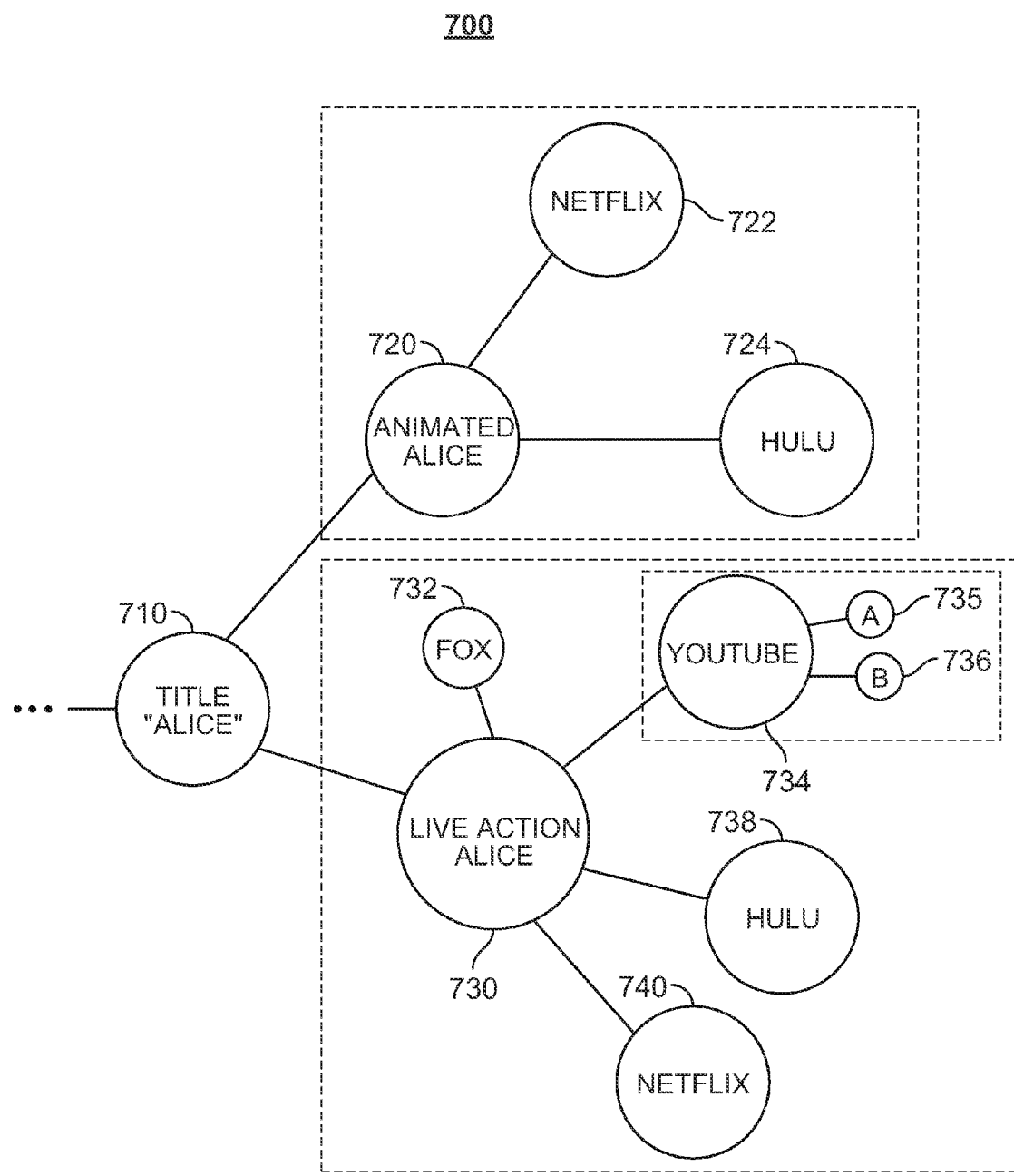
FIG. 7 illustrates examples of data clusters in some embodiments of the present disclosure.

FIG. 7 illustrates examples of how media content records may be organized in an aggregation database. The records of the database may be organized into data clusters of nodes in a tree structure 700. The hierarchy of the tree may be organized according to different categories of guidance data. To avoid overcomplicating the figure, a subset of the tree structure is shown. For example, title node 710 indicates that the records contained in the branches of this node have the keyword "Alice" in the title. Node 720 corresponds to candidate record 630 for the animated film version of "Alice in Wonderland" and contains corresponding received records. Node 730 corresponds to candidate record 640 for the live action film version of "Alice in Wonderland" and contains corresponding received records.

Leaf nodes of the tree structure correspond to primary data records received from external data sources that have been matched and linked to a candidate record in the aggregation database. As described above in reference to FIG. 4, external data sources may include any of web servers 430, media content source 416 and media guidance data source 418. For example, records 722 and 724 correspond to media assets for the animated version of the film that are available from a first web server corresponding to NETFLIX and a second web server corresponding to HULU, respectively. Records 732, 734 and 738 correspond to media assets for the live-action version of the film that are available from a broadcast channel FOX, YOUTUBE, and HULU, respectively. In some embodiments, sub-leaf nodes may indicate different variants of the program from the same media content provider. For example, YOUTUBE may have two records, 735 corresponding to a Hi-Definition version and 736 corresponding to a Standard Definition version.

In some embodiments, control circuitry of a computer equipment running a media management application may generate the display 500 shown in FIG. 5 based on the information contained in the tree structure 700. The control circuitry may direct a display device to show the generated display 500. For example, listing 525 in content access information region 520 may be generated from node 732. Listings 532, 535 and 540 of content access information region 530 may be generated from nodes 740, 738 and 734, respectively. Listing 562 in the content recommendation region may be generated from record 720, corresponding to the animated version of the film.

In some embodiments, the data structures represented by FIG. 7 may change in response to different operations on the nodes. For example, control circuitry 304 of a computer equipment running a media guidance management application may create a new title node in response to receiving input from an administrator requesting creation of a new set of records for a new program title. New leaf nodes of the tree structure may be created in response to receiving primary records from external data sources that are matched to records for movies stored in the aggregation database.

For example, the control circuitry may receive a primary record from I/O path 302, and execute a matching process against candidate records stored in the aggregation database. Upon determining a matching candidate record, the control circuitry may link the primary record to the candidate record, and create a new leaf node. For example, leaf-nodes 722, 724, 734, 738, and 740 may be generated in this way. Sub-leaf nodes may generated in a similar way. For example, the aggregation database may initially include a record of a hi-definition version of the live-action movie Alice in Wonderland provided by Youtube. Accordingly, FIG. 7 would initially include leaf-node 734 and sub-leaf node 735. The control circuitry running the media management application may receive from I/O path 302, a record corresponding to a standard definition version of the live-action movie "Alice in Wonderland", also provided by Youtube. In response to receiving the record, control circuitry may execute a matching process to match the received primary record to the candidate record 734. The control circuitry may subsequently direct the aggregation database to generate a new record and corresponding sub-leaf node 736 for the received record.

In some embodiments, the control circuitry running the media management application may receive a primary record that is a duplicate of a stored candidate record. In some embodiments, in response to determining that a received record is a duplicate by a matching process, control circuitry may discard the received record. In some embodiments, in response to determining that a received record is a duplicate by a matching process, control circuitry may link the received record to the candidate record.

In some embodiments, the control circuitry may update attribute information of matched candidate records based on attribute information in a received and linked primary record. As an example, node 730 may correspond to record 640, and leaf node 738 may correspond to record 610. As described above in reference to FIG. 6, in response to determining that primary record 610 corresponds to candidate record 640, the control circuitry may incorporate the cast attribute and information from primary record 610 into candidate record 730.

In some embodiments, the control circuitry may determine that one or more candidate records are duplicative of each other. For example, control circuitry may determine that candidate record 730 and another candidate record (not shown) both correspond to the same live-action movie "Alice in Wonderland." The determination may be made after updating candidate record 730 to include attribute information from a linked and matched primary record.

In some embodiments, the illustration of FIG. 7 may be provided as a display screen 700 to visualize the media content records stored in the aggregation database. The display screen 700 may be interactive, enabling user selection and manipulation of nodes. For example, control circuitry of a computer equipment may direct a display device to show display screen 700. Portions of the displayed tree structure may be user interactive. For example, in response to receiving a user selection of node 730, control circuitry may direct the display device to show a corresponding media guidance application display screen 500 from FIG. 5. The display screen 700 may enable users to drag and drop nodes to different parts of the data structure to correct mis-matched records. For example, in response to receiving a user input indicating selection of a node 732 and movement of node 732 from node 730 corresponding to the live-action version of the film, to node 720 corresponding to the animated version of the film, control circuitry may direct the database to unlink the record corresponding to node 732 from node 730, and link node 732 to node 720.

Figure 8A:
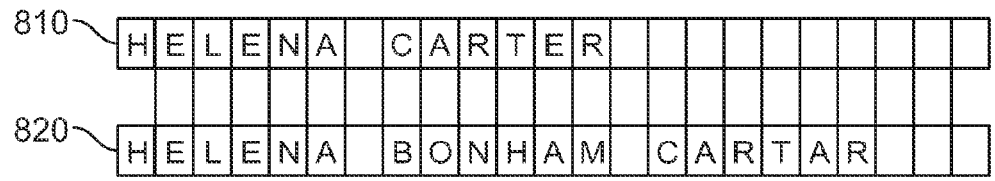
FIGS. 8A-C illustrate examples of fuzzy matching algorithms in some embodiments of the present disclosure.
Figure 8B:
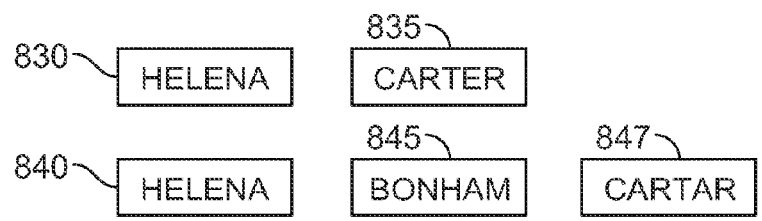
Figure 8C:
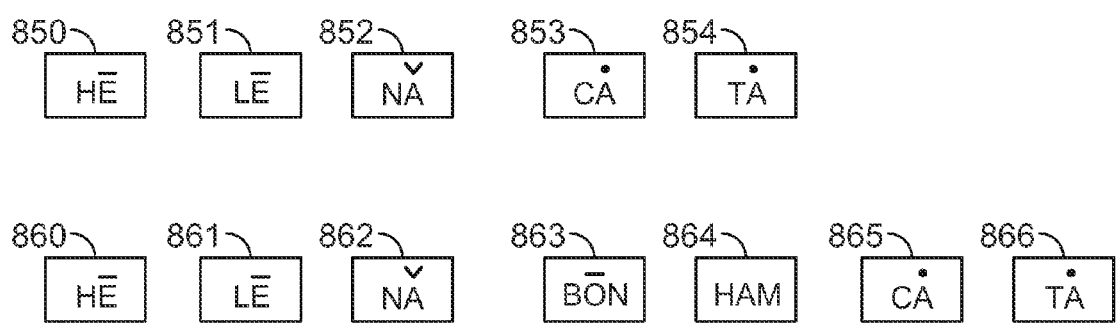

FIG. 8 illustrates examples of fuzzy matching Algorithms that may be used in some embodiments of the present disclosure. The Matching Process discussed above in reference to FIG. 7 compares text that may be similar, except for differences in spacing, spelling, organization, or formatting. Fuzzy matching algorithms can quantify the similarity between two strings of text as a text match score. Such algorithms are especially pertinent for variable length text fields in some attributes of guidance data, such as names of a title and cast members. Three examples of fuzzy matching are illustrated: character level matching in FIG. 8A, tokenized matching in FIG. 8B, and phonetic matching in FIG. 8C. To describe operation of these algorithms, two text strings will be compared, corresponding to slightly different names of the same actress. The first string is "HELENA CARTER" from record

610 in FIG. 6 and the second string is "HELENA BONHAM CARTAR" from record 620 in FIG. 6

FIG. 8A illustrates character level matching, the simplest algorithm that operates on raw text of strings. This matching algorithm generates text match scores based on comparisons of the characters in the strings, fractions of matching characters or non-matching characters, or any suitable combination thereof. For example, control circuitry may compute a text match score based on the number of matching characters between a first and second string. Various factors affect the text match score from comparing two strings, such as the parse direction. When parsing the first and second strings shown in FIG. 8 from left to right, there are 7 matching characters. When parsing the first and second strings from right to left, there are 5 matching characters. In order to account for such variance, control circuitry may compute a text match score by combining scores resulting from different variants of character level matching by summation, geometric averaging, arithmetic averaging, weighted averaging, any other suitable combining or any combination thereof. For example, a text match score may be computed as a sum of the matching characters from both parse directions, in this case 12.

To improve the accuracy of the matching, text strings may be pre-processed to remove white spaces or punctuation marks, normalize abbreviations, convert all characters to lower case or upper case, or any other suitable pre-processing. For example, the prefix "Dr." and suffix "M.D." may be effective matches that connote the meaning of "medical doctor." To resolve this difference in representation, control circuitry of a computer equipment may remove the prefix Dr. from a first string, remove the suffix M.D. from a second string, and incorporate the effective match into a text match score as a fixed or variable value. In some embodiments, the impact of the effective match on the text match score may be set at a fixed value, such as 3 equivalent matching characters. In some embodiments, the impact of the effective match may be adjusted based on the number of other characters that match. For example, the value of the effective match may be calculated as a percentage of other matching characters, since the prefix plays an ancillary role in names. If the impact of the score is not adjusted based on number of other matching characters, it is possible for abbreviations to have more effect than actual matching characters. As an example of a valid match score, consider a first string "Bob" and a second string "Bob." The character level matching score is 3 for these two strings. As an example of an invalid match score, consider the third string "Dr. Tom" and fourth string "Jim M.D." If prefix and suffix of the third and fourth string are removed, control circuitry of a computer equipment would compute a match score of 0. However, if the effective match score of "Dr." and "M.D." were assigned a fixed value of 3, the total match score of "Dr. Tom" and "Jim M.D." (an invalid match), would be equal to the match score of "Bob" and "Bob" (a valid match). Accordingly, an effective match score resulting from pre-processing may be assigned a variable value based on the number of non-extracted characters.

FIG. 8B illustrates tokenized matching that is used to compare tokens parsed from the first and second strings. For example, the first string "HELENA CARTER" may be parsed into two tokens: "HELENA" 830 and "CARTER" 835. The second string "HELENA BONHAM CARTAR" may be parsed into three tokens: "HELENA" 840, "BONHAM" 845 and "CARTAR" 847. Each token may be pre-processed in similar ways described above in reference to character-level matching. For example, a first token containing the abbreviation "Dr." and a second token containing the abbreviation "M.D." may be normalized to the common token "MD". A text match score may be computed based on comparisons of the tokens. The tokens may be compared by character level matching. Compared to character-level matching, tokenized matching uses additional information about the structure of text strings; for example, the number and order of tokens. Tokenized matching of the first and second strings reveals that first and last tokens of first and second strings match, but the middle token of the second string does not have a matching counterpart in the first string. To more accurately compute a text match score, control circuitry of a computer equipment may compute a matching score by assigning the middle token a smaller weight or no weight at all. For example, control circuitry may compute a match score as a fraction: the number of matching characters among all tokens parsed from a first string and a second string, divided by the length of the longer string. Control circuitry of a computer equipment may compare a first set of tokens ("HELENA", "CARTER") with a second set of tokens ("HELENA", "BONHAM", "CARTER") and determine that 11 characters among the tokens match, and that the longer string is 18 characters. Accordingly, control circuitry would compute a match score of 11/18. However, the token "BONHAM" does not have a counterpart in the first string, and should be given less weight, in view of the other matching tokens. By excluding the unmatched token "BONHAM", control circuitry computes a match score of 11/12, which more accurately reflects the matching of the first and second strings.

The importance of tokenized matching and selective weight of unmatched tokens becomes more important when matching large blobs of guidance data extracted from a media content record. As an example, a cast attribute may include a variable number of actors. A first media content record may include the name of one cast member in a cast attribute, while a second media content record may include ten cast members in the cast attribute. Although the first and second content records may correspond to the same program, a fuzzy match of the cast attributes would result in a low score if all the unmatched tokens of the cast attribute of the second record were incorporated into the match score. The effect of the tokenized matching may be configured by control circuitry by adjusting weights of unmatched tokens.

FIG. 8C illustrates a phonetic matching process that compares phonetic components of the text. Phonetic matching provides additional information on top of tokenized matching. The first string "HELENA CARTER" is parsed into the phonetic components 850-854, and the second string "HELENA BONHAM CARTAR" is parsed into the phonetic components 860-866. Comparison of the phonetic components results in a match of 7 components, and 2 unmatched components. Phonetic matching is particularly desirable to accurately compare text containing spelling differences for the same pronunciation; e.g., "CARTER" versus "CARTAR" in the above example. This matching is able to characterize differences between Romanization of the same foreign words or names more accurately than character level or tokenized matching. The increasing popularity of foreign programs will make the accurate characterization and matching of attributes, such as title of a foreign program, more important. For example, the Romanized names "Xiao" and "Hsiao" are identical in Mandarin Chinese, but different in English because "Xiao" follows the Romanization Standard of China, while "Hsiao" follows the Romanization Standard of Taiwan. Control circuitry applying character level or tokenized matching is unable to resolve this nuance. Control circuitry may parse text phonetically by using a lookup table of words, or by analyzing the positions of and arrangements of vowels and consonants in text.

Figure 9A:
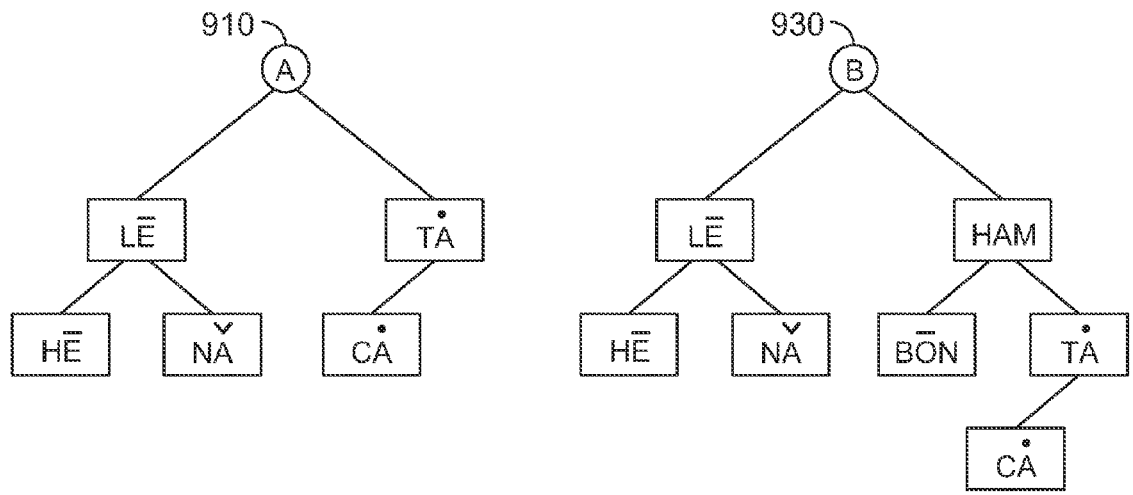
FIGS. 9A-B illustrate examples of data parsing used in fuzzy matching in some embodiments of the present disclosure.

FIGS. 9A and B illustrate examples of data parsing methods used in fuzzy matching in some embodiments of the present disclosure. In FIG. 9A, tokens or phonetic components from a first string and second string may be loaded into a first binary search tree 910 and a second binary search tree 930, respectively. Components of the first binary search tree may be parsed, and matched to components in the second binary search tree. Each binary tree may be parsed in-order, pre-order or post-order. Each of these modes may be selected based on the loading of the data into the three, the structure of the data or tree, and desired mode of comparison. For example, in FIG. 9, the phonetic components of tokenized text are loaded into a binary tree such that each token begins at a left-most leaf node. In such a case, in-order parsing of the tree data structure by control circuitry would be most effective.

Figure 9B:
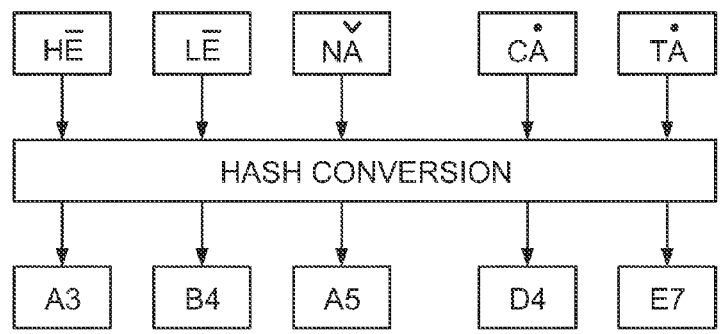

FIG. 9B illustrates the use of hash functions to compare phonetic components. Hash functions allow quick comparison or lookup of a finite number of data components. Because there is a finite number of phonemes in any particular language, the use of hash functions is well suited for comparisons of phonetic components. Control circuitry may generate the hash codes by applying a hash function to each phonetic component, to calculate a corresponding hash code.

Phonetic components of a first and second string may be matched by loading the phonetic components of the first string or second string into an associative data structure, such as an associative array in software, or a content addressable memory in hardware. The associative data structure facilitates easier lookup of an element by addressing the array using the element itself. For example, control circuitry may load the phonetic components of the first string into an associative array in memory, and look up each phonetic component of the second string to determine the number of matching phonetic components between the first string and second string. To account for order of the phonetic components, the sequence of the matched phonetic components may be incorporated into the match score. In this way, control circuitry assigns a higher match score to a comparison between a first phonetic set "Do Re Mi" and a second phonetic set "Do Re Mi" as versus a comparison between a third phonetic set "Do Re Mi" and fourth phonetic set "Mi Re Do", which are in reverse order and represent different words.

The above-described match algorithms vary in the amount of processing power required. Phonetic and tokenized matching may require more processing power than character level matching. Accordingly, the matching algorithms may be performed at servers having vastly greater computing power than portable devices. However, as performance of electronic devices improve with successive generations, it may be possible for portable devices to eventually implement some or all of the matching algorithms described above.

FIGS. 10A-B illustrate examples of data structures for matching rules in some embodiments of the present disclosure. In reference to FIG. 4, a primary content record may be received from an external data source, such as any of web servers 430, media content source 416, and media guidance data source 418. The primary record is to be matched to a candidate record stored in an aggregation database 419. The matching process described above in reference to FIG. 5 may be controlled by user defined rules. There are various attributes in guidance data as described above that include title, cast, release year, director, rating, and synopsis. Matching rules define how a group of attributes are compared to compute a matching score between a primary record and a candidate record. The group of attributes may include zero, one or more attributes. The attributes may be compared by fuzzy matching, binary matching, or any other suitable matching algorithm. Fuzzy matching has been described previously in reference to FIGS. 8A-C and FIGS. 9A-B. Binary matching checks for an exact match between fields with discrete values. For example, a comparison of MPAA ratings of a first media content record and a second media content record is well suited to binary matching because there is a limited number of well-defined values for the MPAA ratings. Accordingly, a comparison of two discrete fields results in either a match or mismatch, and does not result in a partial match.

Each matching rule may comprise one or more filters. As referred to herein, the term "filter" or "filter rule" should be understood to mean a series of comparison descriptors that are used to compute attribute scores, which are combined into a composite score for each candidate record, to quantify the match between a candidate record and primary record.

FIG. 10A illustrates a template data structure for a rule. Each template may include information about a series of content record filters. Each successive content record filter reduces the number of candidate records that are matched to the primary record and included in a result set. Smaller result sets of candidate records are successively filtered. Eventually, control circuitry will either select one candidate record as a match to the primary, or no candidate record based on the composite score of the candidate record.

For example, the rule of FIG. 10A includes at least two filters: a first filter defined by fields 1010-1020 and a second filter defined by fields 1030-1040. Field 1010 contains information about the type of matching score to be computed for the first filter and field 1015 contains information about the evaluation metric used to determine whether a candidate record is included in a result set to be evaluated by a successive filter. Field 1020 refers to a series of comparison descriptors that describe the type of comparison, attribute to be compared, and weight of the attribute score that is used to compute the composite score for a content record. Any number of comparison descriptors can be defined. Field 1030 is analogous to field 1010 and contains information about the type of matching score to be computed for the second filter. Field 1035 is analogous to field 1020 and contains information about the evaluation metric used to determine whether a candidate record is included in a result set of records. Fields 1040 are analogous to fields 1020 that include a series of comparison descriptors.

FIG. 10B illustrates an implementation of a matching rule described in FIG. 10A. Fields 1050, 1055 and 1056-1058 describe a first filter of the rule that evaluates candidate records by computing a weighted score and comparing it to a threshold value. Fields 1060, 1065, and 1066-1068 describe second filter of the rule that evaluates a result set of candidate records from the first filter based on attribute scores computed based on binary matches. The values in the fields of FIG. 10B are illustrative, and any suitable numbering scheme, labeling scheme or values may be used instead.

Field 1050 of the first filter indicates that a composite weighted score will be used to evaluate candidate records. Field 1055 indicates that, in order for a candidate record to be included in a result set, the weight score of the candidate record must exceed an illustrative threshold value of 50. Fields 1056-1058 indicate a series of comparisons that are performed by control circuitry of a computer equipment to compute the weighted score. Field 1056 indicates that a Fuzzy Match is performed on the title attribute, and assigned a weight of 0.5. Field 1057 indicates that a Fuzzy Match is performed on the cast attribute and assigned a weight of 0.2. Field 1058 indicates that a Fuzzy Match is performed on the director attribute and assigned a weight of 0.3. Accordingly, a Fuzzy Match is performed on the title, cast, and director attributes of each candidate record of the aggregation database against the primary record. In some embodiments, the type of Fuzzy Match (e.g., character level matching, tokenized matching, phonetic matching, any other suitable matching or any combination thereof), may be defined by the comparison type field indicated in field 1056.

Each candidate record is assigned a text match score by computing a weighted average of the attribute scores resulting from the Fuzzy Match results of the title, cast and director attributes. The candidate records having a text match score that exceeds the value of 50 are added to a set of candidate records that will be evaluated by the next filter.

Field 1060 of the second filter indicates that binary matches will be used to evaluate the result set of candidate records that passed the first filter. Field 1065 indicates that to be included in a final set of records from the second filter, the total number of binary matches for each candidate record must exceed 50% of the total number of possible binary matches. For example, there are three binary match comparisons 1066-1068 for the second filter. Accordingly, a successful candidate must have at least 2 successful binary match results. Because a binary match is used, the weight value for each of the comparisons is set to 1. In some embodiments, fractional weight values may be used in a binary match in order to allocate different weights to the results of different binary matches. Field 1066 indicates that a binary match will be performed on the ratings attribute and must be equal. Field 1067 indicates that a binary match will be performed on the year attribute and must be equal. Field 1068 indicates that a binary match will be performed on the genre attribute and must be equal. Control circuitry may compute composite scores based on the binary matches defined by fields 1066-1068 for the second filter, and compare the composite scores based on the criteria described in field 1065 to generate a final result set of candidate records. The final result set may be further evaluated to determine a matching candidate record for a primary record.

The received primary records and stored candidate records may not all share common attributes, as described above in reference to FIG. 6. For example, primary record 610 may include the rating attribute, but not the synopsis attribute. Candidate record 640 may include the tag attribute, but not the cast attribute. Accordingly, some matching rules may include attributes for which a primary record or candidate record does not have a value. In some embodiments, to account for this discrepancy, the control circuitry may exclude the attribute from the computation of scores used in the selection of candidate results and determination of matches. In some embodiments, the control circuitry may assign to the null attribute, a placeholder value that is equal to an average of all attributes in the set of candidate records, in order to compute a score, without impacting the ranking or matching of the record that does not include the attribute.

As discussed above in reference to FIGS. 6 and 7, in some embodiments, during the matching process, missing attributes of candidate records may be updated to include attributes of other candidate records or of the primary record. For example, control circuitry may determine that a first candidate record of a set is highly related to a second candidate record in the set. In response, the control circuitry may update the first candidate record to include attributes of the second candidate record that are missing from the first candidate record, and vice versa. As an example, the control circuitry may determine that the first candidate record and the second candidate record are duplicates based on comparing computed scores to a threshold. In response, the control circuitry may merge the first and second records into a single record. For example, the control circuitry may update the first record to incorporate all attribute information from the second record or vice versa.

In some embodiments, a received primary record may include many more attributes than stored in the aggregation database, or attributes that are not recognized by the database. For example, control circuitry of a computer equipment running a media management application may receive a new primary record containing an attribute, such as director, that is not included in the records of the aggregation database. In response to receiving the record and determining that the attribute is not included in the aggregation database, the control circuitry 304 may direct the aggregation database 419 to add a new field for the attribute, director. In some embodiments, this addition may occur after a received primary record is matched with a candidate record.

Figure 11:
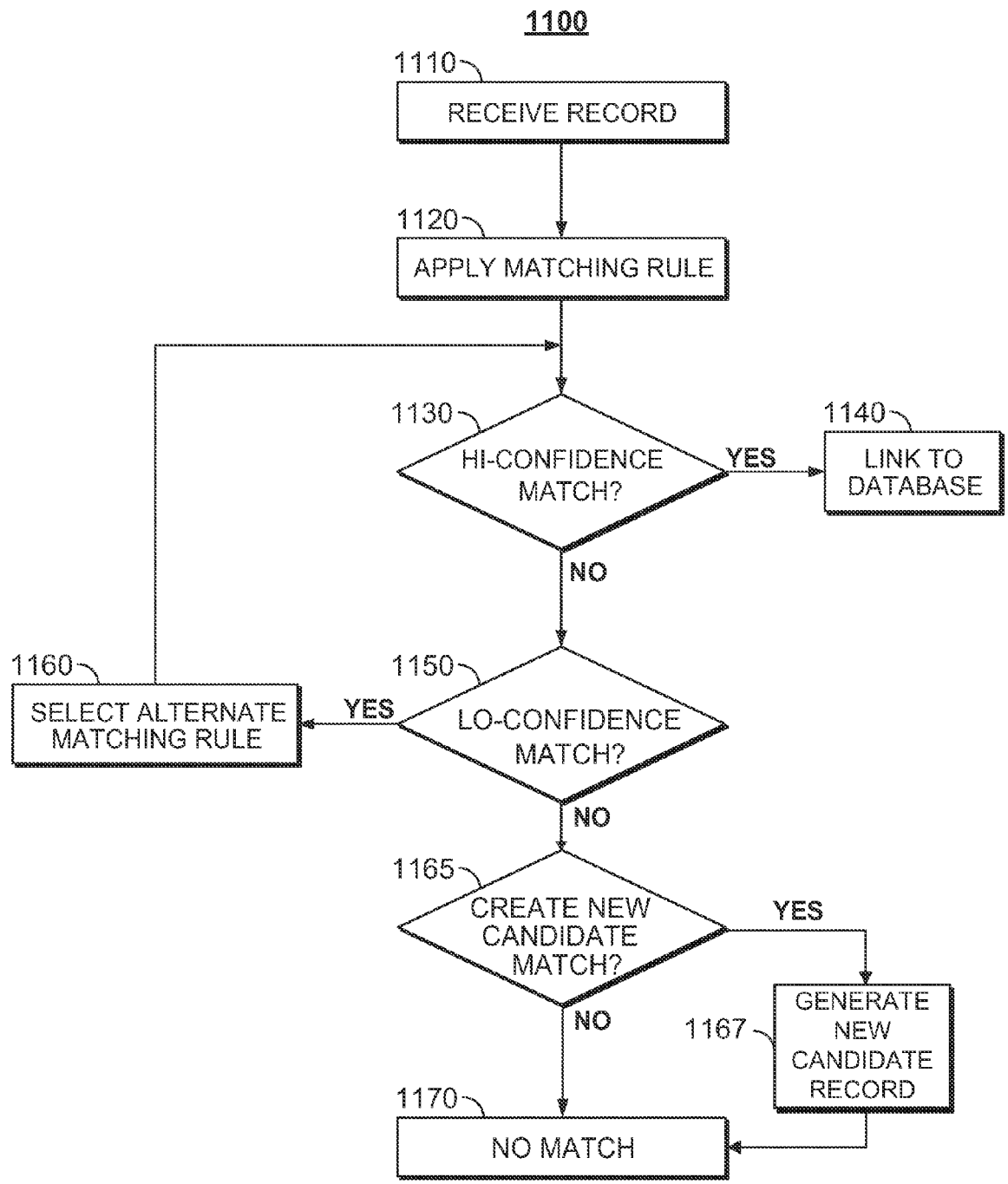
FIG. 11 illustrates a flowchart of steps that may be performed by a system for matching received primary media content information with a stored candidate content record in some embodiments of the present disclosure.

FIG. 11 illustrates a flowchart of steps that may be performed by a system for matching a primary record with a candidate record in some embodiments of the present disclosure. In some embodiments, the steps of FIG. 11 may be performed by one or more servers 430 running a media management application that is located in a remote location from user television equipment or user devices. In some embodiments, the steps of FIG. 11 maybe performed by computer equipment that is local and in close proximity to the user. At step 1110, control circuitry 304 of computer equipment running a media management application receives a primary record from an external data source. For example, the control circuitry 304 may receive a record from I/O path 302 received from an external data source. The external data source may be implemented on a web server 430, media content source 416, media guidance data source 418, any other suitable source or any combination thereof. In some embodiments, the control circuitry of the computer equipment running the media guidance application may select the external data source based on a user profile. For example, the control circuitry may select HULU as a source of primary records, in response to determining that a user has a subscription to HULU, based on a user profile. The output of step 1110 is at least one primary media content record received from an external data source that is to be matched to a candidate record stored in an aggregation database, such as aggregation database server 419.

At step 1120, control circuitry 304 applies a matching rule, described above in reference to FIGS. 10A and 10B to the candidate records stored in an aggregation database. The matching rule may be defined by an administrator of the media management application, or defined automatically. The process for the matching rule is described further below in reference to FIG. 12. The output of step 1120 is a set of candidate records and corresponding composite scores that are evaluated to determine whether at least one candidate matches the primary record. A set of records is a group of records that may include zero or more records.

At step 1130, control circuitry 304 evaluates the result set of the matching rule for a hi-confidence match. For example, control circuitry may first determine a number of candidate records that passed the matching rule. In some embodiments, if there are matching records, control circuitry may select the candidate record with the highest composite score, and compare the composite score to a lo-confidence match threshold. If the composite score is greater than or equal to the threshold, control circuitry proceeds to execute step 1140. If the score is below the threshold or if there are no candidate records in the result set, control circuitry proceeds to execute step 1150. In some embodiments, the order of the attributes in the matching rules examined may vary depending on the matching rule. For example, certain relevant attributes (such as title), may be screened first.

At step 1140, control circuitry links the received primary record to a matching candidate record in the database. The linking may be performed in data structures that are stored in memory of the control circuitry and computer equipment. For example, in reference to FIG. 7, a new leaf node 722 corresponding to the primary record may be added to the matching candidate record 730. In some embodiments, control circuitry may update the matching candidate record with additional attribute information from the primary record. For example, control circuitry may determine that the cast attribute of the primary record includes a larger number of tokens, described for example to FIG. 6, compared to the cast attribute of the matching candidate record, and accordingly more cast information. In response, control circuitry may copy over the additional tokens from the primary record into the matching candidate record. In some embodiments, the format of the data structure for the received primary record may be different from the format of the data structure for candidate records stored in the aggregation database. In order to resolve this discrepancy, upon determining a candidate record that matches a primary record, the control circuitry may create a new record in the aggregation database and copy the values of attributes from the primary record to the new record. The control circuitry may link the created record to the candidate record by including a pointer in the new record to the candidate record, or by including an identification code of the candidate record in the new record.

At step 1150, control circuitry determines whether there is a lo-confidence match of primary record to a candidate record. For example, control circuitry may compare the scores of the result set of candidate records to a lo-confidence match threshold. Control circuitry may select the candidate records corresponding to scores that are greater than or equal to the lo-confidence match threshold as a rescreen set of candidate records for a subsequent evaluation. If the rescreen set includes at least one candidate record, control circuitry proceeds to execute step 1160. If the rescreen set is empty, control circuitry proceeds to step 1170.

Step 1160 is optional. In some embodiments, alternate matching rules may be applied to the result set output by step 1120. In some embodiments, the matching process may terminate without further application of rules. At step 1160, control circuitry applies an alternate matching rule to the rescreen set of candidate records. Control circuitry evaluates a result set of candidate records from the alternate rule for hi-confidence matches in step 1130, and as needed lo-confidence matches in step 1150. In some embodiments, a maximum number of rescreen matches may be applied. Control circuitry 304 may maintain a counter in storage 308 that tracks the number of rescreening matches. In response to determining that the counter exceeds a maximum number, control circuitry proceeds to step 1165.

Step 1165 is optional. During some executions of a matching process, no candidate record is determined to be a match to the primary record. For example, the control circuitry may output a result set of candidate records from step 1120 that include no records that passed the matching rule. Alternatively, the candidate records included in the result set from step 1120 may not pass either the hi-confidence match test in step 1130 or lo-confidence match test at step 1150. For example, the control circuitry may compare the composite scores of the candidate records of the result set to threshold values and determine that the composite scores do not pass the threshold criteria. Consequently, at step 1165, control circuitry determines whether a new candidate record should be created. For example, control circuitry may determine whether to create a new candidate record based on a setting by an administrator of a media management application run by the control circuitry. If the control circuitry determines that a new candidate record is to be generated, the process proceeds to step 1167, otherwise, the process proceeds to step 1167.

At step 1167, control circuitry has determined that a new candidate record is to be generated in the aggregation database for an unmatched primary record. The control circuitry directs the aggregation database to generate a new record, and transfer the attribute values of the unmatched primary record to the new record. With reference to FIG. 7, if the control circuitry determines that the primary record had an unmatched title, it directs the aggregation database to create a new title node. If the control circuitry determines that the primary record has a matched title (for example "Alice in Wonderland"), but other unmatched parameters, the control circuitry directs the aggregation database to create a new candidate node linked to the respective title node 710.

At step 1170, control circuitry has determined that there is no hi-confidence match or lo-confidence match for the primary record. Control circuitry may direct a display device 312 to show an error message indicating that there are no matches for the primary record. In some embodiments, control circuitry may terminate the process. In some embodiments, control circuitry may display a notification that a new candidate record has been generated based on the primary record. In some embodiments, at step 1170

Figure 12:
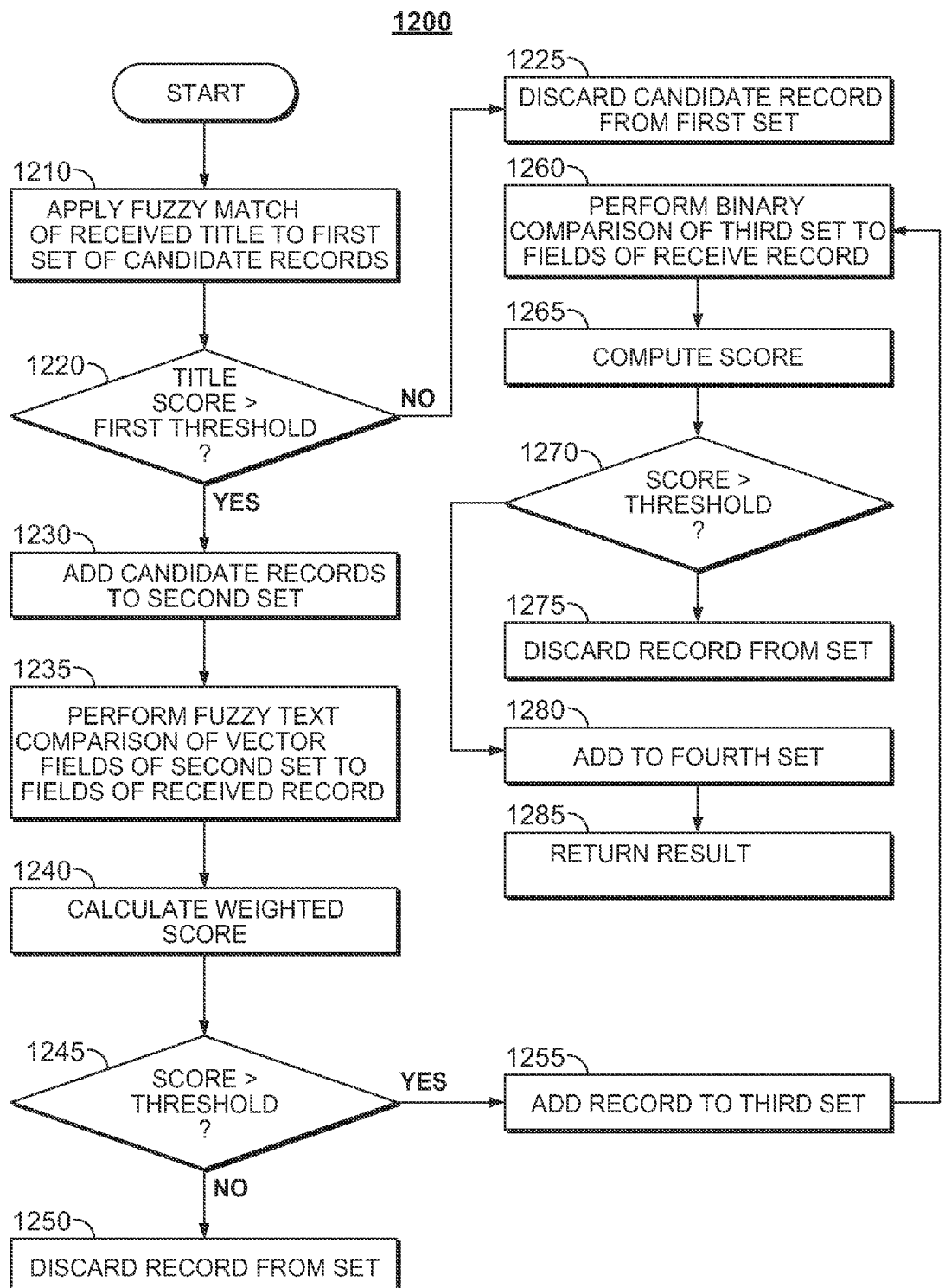
FIG. 12 illustrates a flowchart of steps that may be implemented by a system for executing a matching rule in some embodiments of the present disclosure.

FIG. 12 illustrates a flowchart of steps that may be implemented by a system for executing a matching rule in some embodiments of the present disclosure. The matching rule described in this flowchart may be defined according to the data structure described above in reference to FIG. 10A. The sequence of steps described in this flowchart is an illustrative example of a process that may be used in step 1120 described above in reference to FIG. 11. At step 1210, control circuitry of a computer equipment implementing a media guidance application applies a fuzzy match to the title of a received primary record and to a set of candidate records stored in an aggregation database. The control circuitry assigns each candidate record a composite text match score. In some embodiments, comparing the title as a first filter is desired because the title may be a highly relevant attribute that is searched by users. For example, users of media guidance applications often search for media content by title. Accordingly, in matching the program of a primary record to the program of a stored candidate record, title may be the first attribute to be compared. Other attributes may be compared as well, and the order of attribute comparison may be changed to optimize for accuracy or throughput. For example, the overhead for performing a binary comparison may be lower than overhead for performing a fuzzy text match. Accordingly, in some embodiments, binary matches are performed before fuzzy matching.

At step 1220, control circuitry compares the composite text match scores of each candidate record against a first threshold value of the first filter. In response to determining that the text match score of a candidate record is below the first threshold, control circuitry proceeds to step 1225 and does not include the candidate record in a second set of candidate records. In response to determining that the composite text match score of a candidate record is greater than or equal to the first threshold, control circuitry proceeds to step 1230 and adds the candidate record to a second set of candidate records.

At step 1235, control circuitry applies a second filter to the second set of candidate records, output by the first filter. Control circuitry performs Fuzzy Matches of several attributes from the primary record and candidate records from the second set of candidate records. Based on the Fuzzy Matches, control circuitry will compute a composite weighted score for each candidate record. The attribute and weights used in the fuzzy matching and computation of composite scores may be defined in a rule template, as described above in reference to FIGS. 10A-B.

At step 1245, control circuitry compares the composite weighted scores of each candidate record of the second set to a second threshold. In response to determining that a candidate score is below the threshold, control circuitry proceeds to step 1250 to discard the candidate record. In response to determining that a candidate score is greater than or equal to the threshold, control circuitry adds the candidate record to a third set of candidate records.

At step 1260, control circuitry performs binary matches on the third set of candidate records to one or more discrete fields of the primary record. Control circuitry performs binary matches based on fields defined by a rule template described above in reference to FIG. 10A.

At step 1265, control circuitry computes a composite score for each candidate based on the binary matches. In some embodiments, the control circuitry may sum the number of binary matches of attributes to generate the composite score. In some embodiments, the control circuitry may compute a weighted average of binary match scores by multiplying binary match scores by respective weights, as illustrated in FIG. 10B. Computed scores may be used in step 1270, described below, to select passing and failing candidate records. In some embodiments, each binary match may be used to successively filter candidate records that do not pass the binary match. For example, control circuitry after executing each binary match, may discard failing candidate records in the current set of candidate records. In some embodiments, control circuitry executes all binary matches simultaneously, and discards all failing candidate records from the current set of candidate records.

At step 1270, control circuitry compares the binary match scores of the candidates to a third threshold. In response to determining that the binary match score of a candidate record exceeds the third threshold, control circuitry proceeds to step 1280 and includes the candidate record in a fourth set of candidate records. In response to determining that the binary match score of a candidate record does not exceed the third threshold, control circuitry proceeds to step 1275 and does not include the candidate record in the fourth set of records. After comparing all the scores of each candidate record against the third threshold, control circuitry produces a set of result records and proceeds to step 1285.

At step 1285, control circuitry returns the result set of candidate records produced by step 1280. The returned result set may be evaluated by step 1130 of the process described above in reference to FIG. 11 to determine whether there is a hi-confidence match or lo-confidence match for the primary record to a candidate record. In some embodiments at step 1285, the candidate records of the result set may be evaluated for duplicates. For example, the control circuitry may select candidate records having high composite scores, indicating high chance of matching to the primary record. The control circuitry may then execute a matching process on the selected high scoring candidate records. Scores of the matching process may be compared to a threshold to determine whether any candidate records are duplicates. In response to determining duplicate candidate records, the control circuitry may merge the duplicate candidate records into a single record, by combining attribute values of each duplicate into a single record. For example, with reference to FIG. 7, if control circuitry were to determine that nodes 720 and 730 were duplicate nodes, it would direct an aggregation database to generate a new record and copy attributes from the record corresponding to node 720 and the record corresponding to node 730 and into the new record. Next, control circuitry would direct the database to re-link the records corresponding to the leaf nodes of duplicate nodes 720 and 730 to link to the new node. The records corresponding to the duplicate nodes 720 and 730 are then deleted. In some embodiments, instead of generating a new record, control circuitry copies and attributes from a first duplicate record into a second duplicate record, and re-links records corresponding to leaf nodes of the first duplicate record to the second duplicate record.

It should be understood that in the above described steps, control circuitry of a computer equipment may simultaneously compare all or a subset of the candidate records stored in an aggregation database. The sequence of steps described in FIG. 12 is illustrative, and the steps are interchangeable and may be reordered in any sequence, or executed simultaneously, according to a design or setting of the media management program.

Figure 13:
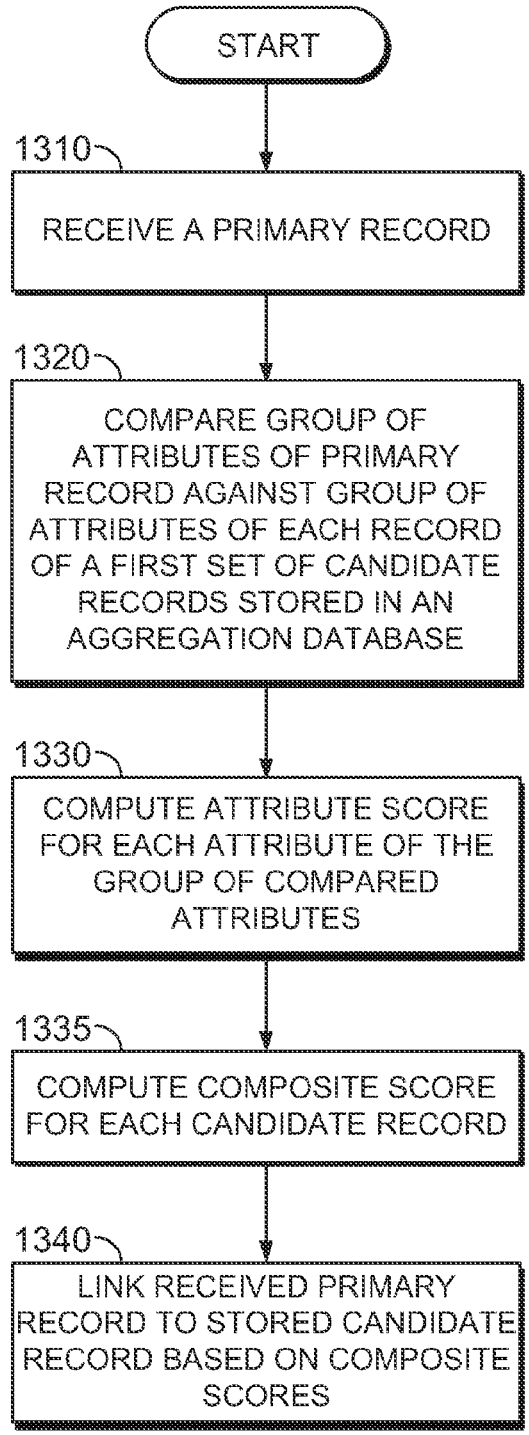
FIG. 13 illustrates a flowchart of steps that may be performed by a system for matching received primary media content information with a stored candidate content record in some embodiments of the present disclosure.

FIG. 13 illustrates a flowchart of steps that may be performed by a system for matching received primary media content information with a stored candidate content record in some embodiments of the present disclosure. As discussed above in reference to FIG. 11, in some embodiments, the steps of FIG. 13 may be performed by one or more servers 430 running a media management application that is located in a remote location from user television equipment or user devices. In some embodiments, the steps of FIG. 13 may be performed by computer equipment that is local and in close proximity to the user. At step 1310, control circuitry of a computer equipment receives a primary record from an external data source.

At step 1320, the control circuitry compares a plurality of attributes of the primary record against a plurality of attributes of each candidate record of a first set of candidate records stored in an aggregation database. As examples, the first set of candidate records may include all records in the aggregation database, or may be selected by the control circuitry in response to executing a matching process based on the title attributes or any other suitable attributes.

At step 1330, the control circuitry computes an attribute score for each attribute of the plurality of compared attributes. For example, the control circuitry may perform a fuzzy matching or binary matching on attributes of the primary record and candidate records in the first set.

At step 1335, the control circuitry computes a composite score for each candidate record in the first set. For example, the control circuitry may compute the composite score as a weighted average of a number of the attribute scores.

At step 1340, the control circuitry links the primary record to a candidate record stored in the aggregation database based on the composite scores computed in step 1335. For example, the control circuitry may compare the composite score of each candidate record to a threshold, and select the candidate record having the highest composite score exceeding the threshold as the matching candidate record. The control circuitry then links the primary record to the candidate record. For example, the control circuitry may direct the aggregation database to generate a new record for the primary record and link the new record to the matching candidate record. If there is no candidate record that exceeds the threshold, then there is no matching candidate record, and no linking operation.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel.

What is claimed is:

1. A method of managing an aggregation database comprising:
   receiving a primary media content record from an external source;
   comparing a group of attributes of the received primary media content record against a corresponding group of attributes of each candidate media content record of a first set of candidate media content records stored in the aggregation database;
   computing an attribute score for each compared attribute of each candidate media content record of the first set based on the comparing;
   computing a composite score for each candidate media content record of the first set of candidate media content records by:
      multiplying the attribute score of each compared attribute of each candidate media content record by a corresponding weight to generate a weighted attribute score, and
      adding the generated weighted attribute score of each compared attribute of each candidate media content record to generate the composite score for each candidate media content record; and
   linking the received primary media content record to a stored candidate media content record based on the generated composite scores.

2. The method of claim 1 further comprising:
   comparing a title attribute of the received primary media content record to a title attribute of each candidate media content record stored in the aggregation database; and
   selecting the first set of candidate media content records based on the comparing of the title attributes.

3. The method of claim 2 further comprising:
   performing a fuzzy matching of a first group of attributes of the received primary media content record to a respective group of attributes of each candidate media content record of the first set; and
   computing the composite score for each candidate media content record of the first set of candidate media content records based on the performed fuzzy matching.

4. The method of claim 1 further comprising:
   selecting a second set of candidate media content records from the first set of candidate media content records based on the composite scores of the first set;
   performing a binary comparison of a first discrete attribute of the received primary media content record against a respective discrete attribute of each candidate media content record of the second selected set, wherein linking the received primary media content record to the stored candidate media content record is based on the binary comparison; and
   discarding a candidate media content record from the first set of candidate media content records based on the composite scores of the first set.

5. The method of claim 1 further comprising:
   comparing the composite score to a threshold; and
   linking the received primary media content record to the stored candidate media content record based on the comparison of the composite score to a threshold.

6. The method of claim 5 wherein linking the received primary media content record further comprises:
   linking the received primary media content record to a data cluster in the aggregation database;
   determining if the composite score is below the threshold; and
   generating a new media content record in the aggregation database based on determining that the composite score is below the threshold.

7. The method of claim 1 further comprising:
   determining that a group of stored candidate media content records in the aggregation database are duplicates that correspond to the received primary media content record; and
   merging the group of duplicate stored candidate media content records.

8. The method of claim 1 further comprising:
   comparing the group of attributes of the received primary media content record against the corresponding group of attributes of each candidate media content record of a set of candidate media content records stored in the aggregation database based on a matching rule,
      wherein the matching rule defines a sequence of comparisons of groups of attributes of a given received media content record and corresponding groups of attributes of a given candidate media content record.

9. The method of claim 8 further comprising:
   creating a filter rule based on a vector of attributes, wherein the computing the composite score is based on the vector of attributes corresponding to the filter rule, and wherein the matching rule comprises one or more filter rules.

10. The method of claim 1 further comprising:
    determining that the received primary media content record corresponds to a candidate media content record; and
    updating attributes of the candidate media content record based on attributes of the received primary media content record, if the received primary media content record corresponds to the candidate media content record from the first set.

11. A system for managing an aggregation database comprising:
    control circuitry configured to:
       receive a primary media content record from an external source;
       compare a group of attributes of the received primary media content record against a corresponding group of attributes of each candidate media content record of a first set of candidate media content records stored in the aggregation database;
       compute an attribute score for each compared attribute of each candidate media content record based on the comparing;
       compute a composite score for each candidate media content record of the first set of candidate media content records by:
          multiply the attribute score of each compared attribute of each candidate media content record by a corresponding weight to generate a weighted attribute score, and
          add the generated weighted attribute score of each compared attribute of each candidate media content record to generate the composite score for each candidate media content record; and link the received primary media content record to a stored candidate media content record based on the generated composite scores.

12. The system of claim 11, wherein the control circuitry is further configured to:
compare a title attribute of the received primary media content record to a title attribute of each candidate media content record stored in the aggregation database; and
select the first set of candidate media content records based on the comparing of the title attributes.

13. The system of claim 12, wherein the control circuitry is further configured to:
perform a fuzzy matching of a first group of attributes of the received primary media content record to a respective group of attributes of each candidate media content record of the first set; and
compute the composite score for each candidate media content record of the first set of candidate media content records based on the performed fuzzy matching.

14. The system of claim 11, wherein the control circuitry is further configured to:
select a second set of candidate media content records from the first set of candidate media content records based on the composite scores of the first set;
perform a binary comparison of a first discrete attribute of the received primary media content record against a respective discrete attribute of each candidate media content record of the second selected set, wherein linking the received primary media content record to the stored candidate media content record is based on the binary comparison; and
discard a candidate media content record from the first set of candidate media content records based on the composite scores of the first set.

15. The system of claim 11 wherein the control circuitry is further configured to:
compare the composite score to a threshold; and
link the received primary media content record to a stored candidate media content record based on the comparison of the composite score to a threshold.

16. The system of claim 15 wherein the control circuitry is further configured to:
link the received primary media content record to a data cluster in the aggregation database;
determine if the composite score is below the threshold; and
generate a new media content record in the aggregation database based on determining that the composite score is below the threshold.

17. The system of claim 11, wherein the control circuitry is further configured to:
determine that a group of stored candidate media content records in the aggregation database are duplicates that correspond to the received primary media content record; and
merge the group of duplicate stored candidate media content records.

18. The system of claim 11, wherein the control circuitry is further configured to:
compare the group of attributes of the received primary media content record against the corresponding group of attributes of each candidate media content record of a set of candidate media content records stored in the aggregation database based on a matching rule,
wherein the matching rule defines a sequence of comparisons of groups of attributes of a given received media content record and corresponding groups of attributes of a given candidate media content record.

19. The system of claim 18 wherein the control circuitry is further configured to:
create a filter rule based on a vector of attributes, wherein computing the composite score is based on the vector of attributes corresponding to the filter rule, and wherein the matching rule comprises one or more filter rules.

20. The system of claim 11 further comprising:
determining that the received primary media content record corresponds to a candidate media content record; and
updating attributes of the candidate media content record based on attributes of the received primary media content record, if the received primary media content record corresponds to the candidate media content record from the first set.

* * * * *